UNITED STATES PATENT OFFICE.

THOMAS A. EDISON, OF LLEWELLYN PARK, ORANGE, NEW JERSEY, ASSIGNOR TO EDISON MANUFACTURING COMPANY, OF WEST ORANGE, NEW JERSEY, A CORPORATION OF NEW JERSEY.

PRIMARY AND SECONDARY BATTERY.

No. 858,862.      Specification of Letters Patent.      Patented July 2, 1907.

Application filed January 10, 1906. Serial No. 295,472.

*To all whom it may concern:*

Be it known that I, THOMAS ALVA EDISON, a citizen of the United States, residing at Llewellyn Park, Orange, in the county of Essex and State of New Jersey, have invented certain new and useful Improvements in Primary and Secondary Batteries, of which the following is a description.

My invention relates to primary and secondary batteries of the type employing an alkaline electrolyte and wherein one of the active materials, during the discharge is dissolved in the electrolyte, a suitable depolarizing material being used furnishing oxygen on discharge. An example of a primary battery of this type is the well known Lalande element wherein the metallic zinc is opposed to oxid of copper in a potassium hydrate solution, the zinc on discharge being dissolved in the electrolyte to form an alkaline zincate, and the copper oxid being reduced to the metallic state. An example of a secondary or reversible battery of this type is described in my Patent No. 684,205, dated October 8, 1901, wherein nickel hydroxid is used as the depolarizer, a plate of metallic magnesium being employed to receive the zinc deposit plated out of the alkaline zincate solution by the charging current. With such a secondary battery, on discharge the nickel hydroxid will be reduced to a lower condition of oxidation, and the metallic zinc will be oxidized and dissolved in the electrolyte from which it will be again plated out on the next charging operation.

My present invention is based on the discovery that if an alkaline silicate, preferably silicate of potash, is added to the electrolyte of batteries of the type referred to, the solvent power or capacity of the solution for zinc is very largely increased and may be made actually more than twice that of the usual alkaline hydrate alone. This permits the battery cells to be made considerably smaller than heretofore in order to obtain a given ampere capacity.

In the case of the Lalande combination, using copper oxid opposed to metallic zinc, the best composition for the electrolyte is to add to a twenty per cent solution of potassic hydrate, about fifteen per cent of silicate of potash. In other words, each one hundred cubic centimeters of the solution contains twenty grams of solid hydrate of potash, to which is added fifteen grams of powdered silicate of potash; but it will be of course understood that the proportion of ingredients used may be varied within wide limits, and, in fact, that the addition of even a small percentage of silicate of potash adds to the useful effect.

When the solution is used in connection with reversible or secondary batteries employing nickel hydroxid opposed to metallic zinc, as described in my patent above referred to, the proportions of potash and of the alkaline silicate can be conveniently increased, since there is less likelihood of the solution freezing than with a primary battery, which latter are ordinarily used in more exposed places, such as for railroad signaling. The employment of the new electrolyte in connection with an alkaline zincate reversible battery, reduces the weight of such batteries considerably.

It will of course be understood that the improved electrolyte may be used in any alkaline zincate battery, either primary or secondary, and that any suitable active depolarizing material may be employed, such as oxids of copper, silver or mercury or the hydroxids of nickel or cobalt.

I am not able to explain with absolute certainty the cause of the very superior results which are secured when an alkaline silicate is added to the solution as above explained, but I believe the results are due to the fact that the oxid of zinc formed on discharge is converted into a double salt of silicon and potassium (silico-zincate of potash) which is much more soluble in the alkaline solution than the single salt of zinc and potassium, or that silicate of zinc is formed which is soluble and forms a double salt with the alkali, and consequently less of the electrolyte may be used to hold the dissolved metal in solution.

I have referred particularly to the use of silicate of potash as the preferable alkaline silicate for the purpose, since I have secured the best results with this material when added to a solution of potassium hydrate as explained. Very good results may be secured, however, with silicate of soda in a potash solution, although not quite so good as with silicate of potash. In solutions of soda, the addition of an alkaline silicate results in very little improvement.

Having now described my invention, what I claim as new and desire to secure by Letters Patent is as follows:

1. An alkaline battery electrolyte containing an alkaline silicate, as set forth.

2. An alkaline battery electrolyte containing silicate of potash, substantially as set forth.

3. A battery electrolyte containing potassium hydrate and an alkaline silicate, as set forth.

4. A battery electrolyte containing potassium hydrate and potassium silicate, as set forth.

5. In a battery, the combination of an electrode employing metallic zinc, a second electrode employing a depolarizing mass, and an alkaline electrolyte containing an alkaline silicate, substantially as set forth.

6. In a battery, the combination of an electrode employing metallic zinc, a second electrode employing a depolarizing mass, and an alkaline electrolyte containing silicate of potash, substantially as set forth.

7. In a reversible battery, the combination of an electrode employing metallic zinc, a second electrode employing nickel hydroxid as a depolarizer, and an alkaline electrolyte containing an alkaline silicate, substantially as set forth.

8. In a reversible battery, the combination of an electrode employing metallic zinc, a second electrode employing nickel hydroxid as a depolarizer, and an alkaline electrolyte containing silicate of potash, substantially as set forth.

9. In a reversible battery, the combination of an electrode plate of metallic magnesium, a second electrode employing a depolarizing mass, and an alkaline zincate electrolyte containing an alkaline silicate, substantially as set forth.

10. In a reversible battery, the combination of an electrode plate of metallic magnesium, a second electrode employing a depolarizing mass, and an alkaline zincate electrolyte containing silicate of potash, substantially as set forth.

This specification signed and witnessed this 9th day of Jany. 1906.

THOS. A. EDISON.

Witnesses:
FRANK L. DYER,
ANNA R. KLEHM.